the whirls formed under setoff levels prevent the fiber parts from coming into direct contact with the walls, so that a considerably reduced bead content results in combination with the strong flow expansion and ensuing reduction of mutual contact and penetration of fiber parts. The diameter distribution of the fibers is smoothed out, since speed distribution, which exhibits strong border stress when it emerges from the drawing gap (8), is smoothed out quicker due to the energy consumed by the whirls. By systematically introducing additional blasting medium in the area of the subsonic diffuser (11), the flow can be systematically influenced in order to meet all the requirements posed for fiber quality.

United States Patent [19]

Hirschmann et al.

[11] Patent Number: 4,961,695
[45] Date of Patent: Oct. 9, 1990

[54] FACILITY FOR GENERATING FIBERS, IN PARTICULAR MINERAL FIBERS, FROM A MOLTEN MASS

[75] Inventors: Clemens Hirschmann, Ilvesheim; Heinz-Jürgen Ungerer, Viernheim; Joachim Mellem, Schriesheim, all of Fed. Rep. of Germany

[73] Assignee: Grunzweig & Hartman AG, Fed. Rep. of Germany

[21] Appl. No.: 316,705

[22] Filed: Feb. 28, 1989

[30] Foreign Application Priority Data

Mar. 7, 1988 [DE] Fed. Rep. of Germany ....... 3807420

[51] Int. Cl.$^5$ ............................................. C03S 37/02
[52] U.S. Cl. ........................................ 425/72.2; 65/5; 65/7; 65/16
[58] Field of Search ................. 65/5, 7, 16; 425/72.1, 425/72.2, 7; 264/12, 211.12

[56] References Cited

U.S. PATENT DOCUMENTS

| | | | |
|---|---|---|---|
| 3,929,542 | 12/1975 | Gehrig et al. | 425/72.2 |
| 4,337,074 | 6/1982 | Muschelknautz et al. | 65/5 |
| 4,533,376 | 2/1985 | Muschelknautz et al. | 65/5 |
| 4,539,029 | 9/1985 | Muschelknautz et al. | 65/5 |
| 4,676,815 | 6/1987 | Wagner et al. | 65/16 |
| 4,744,810 | 5/1988 | Battigelli et al. | 264/12 |

Primary Examiner—Jay H. Woo
Assistant Examiner—Khanh P. Nguyen
Attorney, Agent, or Firm—Nixon & Vanderhye

[57] ABSTRACT

In an unraveling facility according to the blast drawing process a subsonic diffuser (11) is arranged following the blast pipe (6). The subsonic diffuser (11) is designed as a thrust diffuser with a sudden cross-sectional widening of its flow border in order to form several stages (13, 14, 15). In this way, a larger median expansion angle ($\alpha$) can be chosen without risking detrimental detachment of the main flow than is possible with subsonic diffusers having a continuous flow border. Furthermore, the 16 Claims, 6 Drawing Sheets

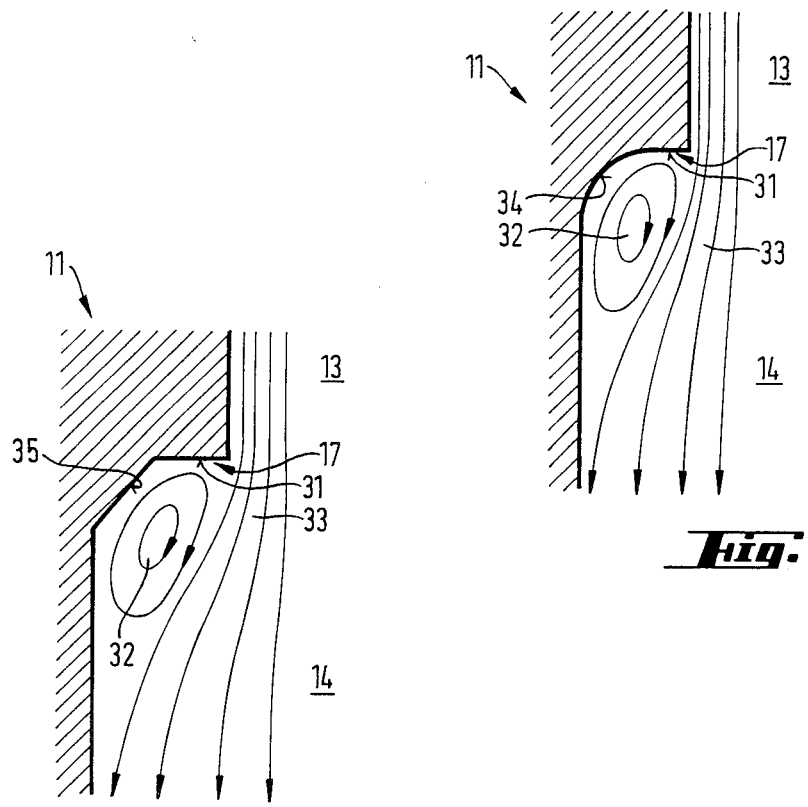
Fig. 3
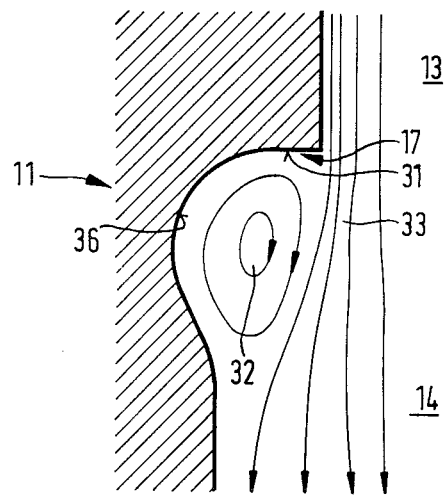
Fig. 4
Fig. 5

FACILITY FOR GENERATING FIBERS, IN PARTICULAR MINERAL FIBERS, FROM A MOLTEN MASS

BACKGROUND OF THE INVENTION

1. Field of the Invention

This invention relates to a facility for generating fibers, in particular mineral fibers, from a molten mass.

2. Description of Related Art

During blast drawing, primary fibers emerging, as a rule, from a series of openings in a molten mass separating device are fed to the drawing gap of a blast pipe. They are then accelerated in a flow of gas that is fed to the drawing gap at the same time and, thus, they are pulled. The speed profile of the flow illustrates marked stress along the borders, and the high-speed currents along the borders are generated, as a rule, by a blast flow introduced along the borders, which also introduces into the facility the energy required for the extraction process. Due to the peak speeds reached at the borders and the ensuing vacuums, the primary fibers are subjected to lateral excursion, causing them to swing quickly between the two high-speed zones along the borders. In the process, parts of the fibers time and again come under the influence of the high-speed currents at the border and are swept along, while fiber parts lying in between bridge-over the gap between the high-speed zones along the borders. In this way, effects resembling the cracking of a whip result, in which the fiber parts—under the influence of various flow speeds—are subjected to tensile force and, thereby, are pulled into thin fibers.

Behind the opening of the blast pipe the gas-fiber-dispersion has to be delayed, and the static pressure of the gas flow has to be raised to about the ambient pressure so that the fibers, which become compact when they are cooled off, can, finally, be deposited to form a fibrous web. A subsonic diffuser can be used as a delaying device. In this connection, it must be noted that the flow in the subsonic diffuser exhibits no large swirls or other cross currents, which could move the fibers towards each other and towards the edge of the flow. This is necessary because when fibers that are not yet compact touch each other or the wall, non-pulled material parts (beads) are formed, which, although they do contribute to the overall density of the finished product, cannot assume the function of fibers. If parts of fibers that are not yet sufficiently compact do touch each other, then the fiber, which is under tensile stress, tends to tear at the point of contact, causing the prevailing tensile stress to be eliminated. Moreover, the fiber end tends to recoil into a spherical form because the surface tension of molten masses that are to be processed after blast drawing is many times greater than that of water, and if there are no external forces, it always exhibits the tendency to generate a spherical form with minimal surface per volume. If a fiber part that is not yet completely compact touches the wall, then it is abruptly stopped, also tears, and takes on a spherical form.

To avoid such cross currents, it must be safely ensured that the flow cannot detach itself from the flow border of the subsonic diffuser. Since the flow speed and, thus, also Reynolds, number are very high, safe avoidance of detachment when the flow is delayed in the subsonic diffuser presupposes a very slight opening angle of, at the most, a few degrees.

A good efficiency factor and, thus, slight energy consumption is achieved due to the low-loss pressure conversion in such a narrow subsonic diffuser. Furthermore, the formation of fine, strongly warped fibers is favoured by the fact that the speed profile from the blast pipe is maintained, in terms of quality, over a long stretch in the subsonic diffuser and that the lateral low-pressure zones suck in neighboring fiber parts and subject them to a relative acceleration. For this reason, they provide an additional pulling effect until the parts are compact.

However, the ensuing cross movements of the fiber parts in the direction of the flow border increase the probability of wall contact in view of the slight opening angle, and, thus, there is also increased bead formation caused by such wall contact. Furthermore, the fibers are led in close vicinity to each other over a long stretch so that even slight relative movements can lead to mutual contact and, therefore, also to bead formation. Wall contact and mutual contact of compact fibers are also probable; this leads to a reduction in the median fiber length because the fibers break. For this reason, it is difficult to produce fine fibers with a great median fiber length and a slight share of beads by means of blast drawing.

SUMMARY OF THE INVENTION

In contrast to this, it is the object of the present invention to develop a facility with which fibers having a great median fiber length, a favourable degree of fineness with few beads can be produced.

In this way, the fiber-gas-dispersion is expanded relatively strongly following the sudden cross-sectional widening so that more distance is obtained between the fibers, and the probability of contact is minimized. Downstream of the sudden cross-sectional widening so-called whirls are formed on both sides of the reflux zones, which mark, in terms of flow technique, the border of the main flow. Thus, direct wall contact of fiber parts in the area of the above-mentioned whirls can be avoided if the flow border is formed by another flow and not by a fixed wall. The whirls obtain their kinetic energy from neighboring levels of the main flow so that the speed there is decreased and the speed profile downstream of the whirl is smoothed out. In this way, the tendency of fiber parts or fibers to make transverse movements and, therefore, also the probability of wall contact downstream from the whirls is reduced. Due to the relatively wide expansion of the main stream in the area of the whirls and a speed profile that still exhibits strong stresses along its borders, an additional increased extraction effect on the fiber parts results in view of the enlarged spatial distance between the peak speeds along the borders and their suction effect. This additional pulling of the fibers before they are finally compacted, however, does not result in an increased threat of wall contact since the whirls form a protection against wall contact.

In this way, the overall flow coming from the blast pipe is quickly and relatively strongly expanded and smoothed-out. As a result of the relatively uniform extraction conditions to which the fiber parts are subjected up to the subsonic diffuser, a narrow diameter distribution with a favourable degree of fineness of the fibers is achieved. Due to the gentle delaying in a smoothed-out, relatively strongly expanded flow without wall contact, a great median fiber length with a negligible share of beads results.

If only one single sudden cross-sectional widening of the flow border is provided, then, it should preferably be situated at the crossover from the blast pipe to the subsonic diffuser. In this way, it is possible to expand the main stream at the earliest time possible, because the fibers can then be additionally extracted without problems. The further flow in the subsonic diffuser continues in an already expanded condition with a correspondingly reduced probability of contact between the fibers.

If a thrust diffuser is used, then the efficiency of the pressure conversion is reduced compared to a continuously expanding diffuser, and, thus, it causes an increase in the required energy input. If, however, a multistage thrust diffuser is applied, a so-called stage diffuser, then its efficiency will be increased, approaching that of a continuously bordered subsonic diffuser. Furthermore, by means of a multiple number of stages the main flow can be bordered by whirls and not by a fixed wall, along a longer stretch of the subsonic diffuser. Thus, the above-mentioned beneficial effects will be heightened and the probability of contact between fibers having a fixed flow border will be considerably reduced. In addition, the main flow can be expanded even further without causing detachment, so that the probability of contact between the fibers drops.

Preferably, the length of every stage of the thrust diffuser should not lie below five or six times the difference of the roots of their outlet and inlet cross-sections, so that the main flow can neatly touch the fixed flow border for a short stretch before reaching the next stage. Otherwise there is the danger of large swirls, which would give rise to undesired results such as mostly locally stable, strong unequal flow distribution.

Also preferably, the median expansion angle of the subsonic diffuser can quite definitely be kept small, as is required for continuous subsonic diffusers. However, it can also be increased up to approximately 8° in order to achieve a maximal widening of the main flow within the shortest possible length. Within the meaning of this maximization of the fiber length as well as minimization of the share of beads, a median expansion angle that is as large as possible seems advantageous.

In the back of the whirls, dead zones with secondary whirls can develop if the crossover between the zone having an expanded cross-section and the lower surface of the stage (setoff) has a rectangular shape. If the entering whirls pick up very fine fiber parts and sweep them along, then it is possible that such very fine fibers are deposited in these dead zones. In order to avoid this, the grooves of the setoffs can be provided with corresponding curves or slants so that they meet the form of the impact whirls in this zone, thereby avoiding such dead zones. It is preferable to have a groove at this point, which, compared to the expanded cross-section, has an even further enlarged cross-section. In this groove a secondary whirl can develop fully behind the entry whirl and can be used positively as regards the consumption of the speed energy of the border zones of the main flow, or the entry whirl itself stays put in a correspondingly large, rounded groove. Whereas slight deposits are not disturbing factors in a groove that is located so far away from the main flow, these can also be avoided by a corresponding round form in the sense of a self-cleaning effect.

Particularly in diffuser stages located upstream, which are level with the point where the fibers are still molten, wall contact can still occur downstream of the sudden cross-sectional widening, for example in the flowing-out zone of the whirls (back-up point), due to high transverse acceleration, which, as such, is desirable for achieving additional pulling effects. In order to further reduce this danger, nozzles that introduce a blast medium can be mounted at or below the place where the sudden cross-sectional widening is located. In this way, an additional cushion between the main flow and the wall is formed, further minimizing the danger of wall contacts.

The axis of the nozzles can lie almost parallel to the middle axis of the subsonic diffuser, i.e. achieving a blast-in that runs parallel to the wall. In this way, additional energy, for example in the lower area of the subsonic diffuser, can be introduced when required, i.e. if the stress of the speed profile could move towards the middle as a result of deceleration at its border zone.

However, the axis of the nozzles can also be set transverse to the middle axis of the subsonic diffuser, and the nozzles can be situated downstream, e.g. in the area of a recess in the groove of the setoff. In this way, a stable whirl is formed in the recess, while the main flow is forced away from the wall by the blasting medium, thereby eliminating any wall contact on the part of the fibers. In terms of energy, the blasing medium should preferably be fed over a bent outer or lower periphery in a direction parallel to the main flow so that a primary Coanda effect occurs and the main flow is not excessively constricted.

In practice, numerous primary fibers located next to each other are unraveled in a long-drawn-out blast pipe, along the under side of which a correspondingly long-drawn-out subsonic diffuser can be located. In view of the negligible width of the gap at the face sides of the blast pipe and subsonic diffuser the ends at the face sides remain open to the environment. However, when a subsonic diffuser with cross-sectional widening is used, this leads to disturbances at the face side. This disturbance is all the more serious, the greater the middle expansion angle and the longer the subsonic diffuser are, because the amount of secondary air sucked in on the face side rises drastically in accordance with the distance of the flow borders of the subsonic diffuser. Therefore, it must be provided that in such cases the long-drawn-out subsonic diffuser is isolated from its environment means of face walls. In this way, faultless formation of flow in the subsonic diffuser and, in particular, in the area of the whirls is promoted. In addition, this, possibly in connection with a corresponding front-side cutoff of the blast pipe, can also help to drastically reduce the total amount of secondary air that is sucked in, thereby decreasing the necessary suction energy during fiber deposition. In this way, a profit in the energy balance is attained, which balances the rather negligible efficiency of the pressure conversion in the thrust diffuser.

The flow conditions are further smoothed-out along the entire length of the long-drawn-out subsonic diffuser if the grading of the walls on the face is in accordance with the side walls of the subsonic diffuser. If blasting medium also is fed in at the face walls of the blast pipe, then any end effects are still avoided because, as a result of introducing the blasting medium at the face side, a vacuum corresponding to the static pressure on the speed profile along the side walls can be adjusted and, therefore, flow detachment along the face side is avoided.

Despite all of the measures described above, wall contact can occur between the fibers and the fixed flow border, in particular within the area of the blast pipes, but also in the vicinity of the subsonic diffuser, e.g. directly above a stage. Apart from the detrimental effects, such as increasing the bead content in the fiber blends, this also causes excessive wear of the wall of the blast pipe or the subsonic diffuser. In order to ensure that no fibers cling to the wall upon contact, which can lead to dangerous obstructions, the blast pipe, in particular, has been made of pure nickel up to now. Nickel has a very fine microscopic surface which ensures that the fibers cannot stick to it. However, nickel is not very wear-resistant, so that maintenance and repair work is often necessary.

In this connection, the invention offers a solution by providing the side walls of the blast pipe and/or the subsonic diffuser with cooling ducts for a coolant so that the fixed flow borders are exposed to an intensive cooling action. Due to the strong cooling along the flow borders, fiber parts cool off abruptly when they come into contact with the wall and their surface becomes compact without wetting and they rebound away from the wall. In this way, sticking of molten parts as well as overflooding of the blast pipe with molten mass is excluded. For this reason, the flanks of the blast pipe as well as the side walls of the subsonic diffuser can be made of a lower priced, but still wear resistant, material such as special steel, which is relatively highly alloyed in a high-temperature form and exhibits a higher microscopic roughness.

Moreover, so much heat is removed through the coolant that the climate in the downstream shaft is relieved, i.e. the danger of premature hardening of the bonding agent is already reduced in the fall shaft. Furthermore, due to their wear-resistant design, the parts of the blast pipe can be mounted closer to each other. This causes the temperature level in the unraveling zones to rise, thereby, favouring the formation of more fine and bead-less fibers also from this side. In addition, this measure also contributes to reducing the amount of surrounding media that is sucked in, so that smaller amounts of gas are carried away through the product and need subsequent treatment. Besides, the high degree of recuperation of pressure in the emergence plane of the thrust diffuser with a large expansion angle also contributes to this, and due to the negligible emergence speed of the fiber-gas-dispersion from the emergence plane of the diffuser, less secondary air is sucked in. All these measures, together with the closings on the face of the blast pipe and subsonic diffuser, decrease the energy required for sucking off and subsequently treating the air throughout the product to such a considerable extent that the increased energy yield is more than balanced out by the slighter efficiency of a thrust diffuser in comparison to a continuously expanding diffuser.

BRIEF DESCRIPTION OF THE DRAWINGS

Further details, features, and advantages of the invention are provided in the following description of the design, based on the drawings.

FIG. 3 shows a detail according to Circle A in FIG. 1 in a modified design and enlarged representation;

FIG. 4 essentially corresponds to the detail illustrated in FIG. 3, showing it in another modified design;

FIG. 5 essentially corresponds to the detail illustrated in FIGS. 3 and 4, showing it in another modified design;

DESCRIPTION OF THE PREFERRED EMBODIMENT(S)

Figure 1:
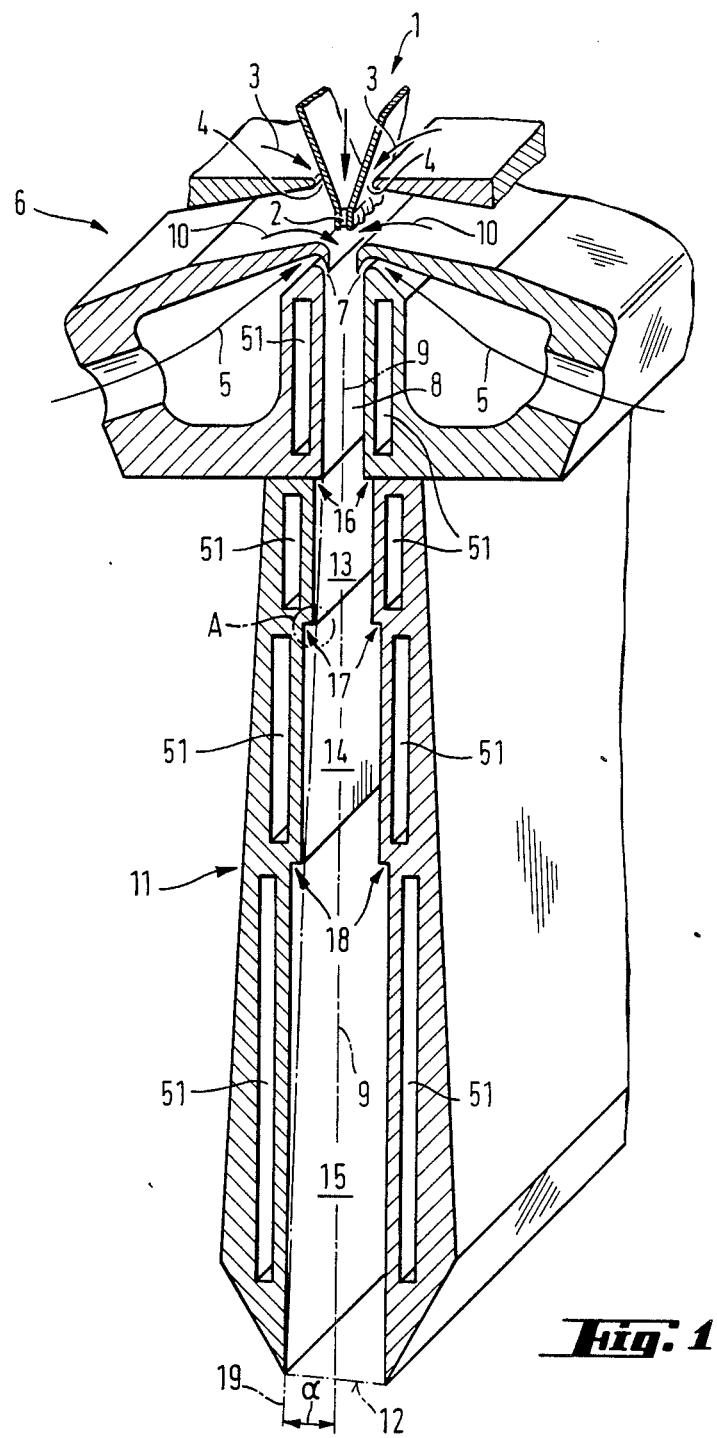
FIG. 1 shows a schematically simplified cross-section of a facility according to the invention for unraveling molten mineral fibers with a three-stage subsonic diffuser.

As shown in FIG. 1, the molten mass, for the present purpose mineral molten mass, is fed from a vat for molten mass, which is not described in detail, to a molten-mass separating device, marked with 1. In the present example, the molten mass emerges from holes (2) in the molten-mass separating device (1) as many primary fibers arranged next to each other. For the sake of clarity, the molten mass itself is not shown. In the present example, the holes (2), which are arranged in a line, have a diameter of approximately 1 to 2 mm and a division of about twice the hole diameter. However, these dimensions can change upwards or downwards, depending on the molten mass. In the present case, the flowing-out area of the molten-mass separating device (1) is tempered by means of hot combustion gases (3). which emerge at high speeds through a narrow gap (4) at both sides of the flowing-out area of the molten-mass separating device (1) and envelope the partial flows of the molten mass in the zone where the primary fibers are formed and moved. The flow of the molten mass of each emergence opening is determined by the temperature and the geostatic pressure of the molten mass, the hole diameter as well as the height of the static vacuum in the emergence plane of the holes (2). In general, this is generated by blasting in a blasting medium (5) through nozzle openings, which is fed to a blast pipe (6) and, in the present example, enters slot-like nozzle openings (7) in the upper area of a drawing gap (8) of the blast pipe. The blasting medium (5) is blasted in through the blast pipes (7) at both sides of the drawing gap (8), generally in a direction parallel to the wall or parallel to the middle axis (9) of the blast pipe (6). In the process, the primary fiber, which is pulled in the suction area, is induced to swing transversely to the main direction of flow; the fast wall streams take hold of it, and it is further accelerated and pulled. The flow speed of the extraction gas currents, which are composed of the actual blasting medium (5) acting as the propellant as well as the sucked-in hot combustion gases (3) and the ambient medium (secondary air) illustrated by 10 and which can definitely attain supersonic speed, depending on the converging-diverging contours of the blast pipe (6), is reduced in a downstream subsonic diffuser (11). The more narrow the subsonic diffuser (11) the more fine but also the shorter the produced fibers. If the subsonic diffuser (11) is designed according to the conventional manner with continuous flow contours, then an expansion angle of maximal 2° is possible at the usual flow speeds without causing any stalls in the flow and ensuing strongly turbulent swinging movements. Particularly in long-drawn-out, "level" subsonic diffusers (11), which are open at the face side, homogeneous conditions for fiber deposition cannot be achieved with a larger expansion angle.

As a rule, the process of fiber formation is completed upon leaving the subsonic diffuser (11). Usually the fiber-air-dispersion is then further decelerated and cooled in a fall shaft by adding coolants, finishing agents, bonding agents and/or additional conditioning agents as well as by sucking in more secondary air. The fibers are then deposited in the form of a fibrous web on a perforated discharge belt located below the shaft, and they are separated from the extracting and sucked-in gases by means of low-pressure chambers with downstream ventilators that are mounted below the discharge belt.

An essential difference between the present facility, according to FIG. 1, and conventional facilities is that the subsonic diffuser (11) does not exhibit a continuous flow border between the lower end of the drawing gap (8) and its emergence plane (12). Instead, as is shown in the present example, it is designed as a thrust diffuser, the flow border of which has three stages (13, 14 and 15) due to the sudden cross-sectional widening or setoffs (16, 17 and 18). The basically well-known single or multiple stage thrust diffuser is characterized by the fact that the main flow tears at those points where there is a sudden cross-sectional widening and only attaches itself to the fixed flow border after a certain flow distance by forming a reflux zone. The higher the number of stages (13, 14 and 15), the greater the efficiency of converting dynamic pressure energy into static pressure energy.

In the facility according to FIG. 1, the individual cross-sectional widenings or setoffs (16, 17 and 18) as well as the lengths of the individual stages (13, 14 and 15) can be dimensioned in such a way that the molten mass and fiber parts, following the extracting gas currents at a certain slippage, can only touch the fixed flow border of the subsonic diffuser (11) at the lower stage end, in which case any wall contacts are almost parallel to the wall, giving rise to merely insignificant deceleration and cooling of molten fibers with subsequent bead formation.

The length of the individual stages (13, 14 and 15) should be chosen in such a way that no more reflux zones are formed in the emergence plane of the stages because these can lead to large currents, which usually are instable and give rise to uneven fiber guidance. From this point of view, the preferred minimum length of the stages (13, 14 and 15) is approximately five- to six-fold the difference of the roots of the respective emergence and entrance cross-section of each stage (13, 14 and 15).

Moreover, the crossover, according to FIG. 1, from the drawing gap (8) to the subsonic diffuser (11) is already designed as a thrust in order to reduce as early as possible the spatial concentration of fibers as far as is required to achieve the desired fiber length, which is influenced by mutual contact between fibers. Thus experts are free to dimension the expansion angle for the main flow, which is given by the cross-sectional widening and the length of the respective stages (13, 14 and 15), in such a way that the product meets the specific requirements as regards fineness, bead content and length distribution of the fibers.

The wall streams generated in the blast pipe (6), which are essentially parallel to each other, can reach and exceed beyond sonic speed, depending on the operating conditions. The compression thrusts generated in connection to this are systematically provoked at the sudden cross-sectional widening at the emergence of the drawing gap (8), because at this point they can still favorably influence the fineness of the primary fiber multiplication.

The walls of the drawing gap (8) are parallel, but can also be designed in such a way that they widen in a conical form with an angle of inclination of up to approximately 2°. Equally, the walls of stages (13, 14 and 15) of the subsonic diffuser can also have a parallel design or one that widens in a conical form, as long as safe, i.e. smooth, flow guidance is ensured. However, the preferred design is that in which the walls of the individual stages (13, 14 and 15) of the subsonic diffuser (11) are parallel.

The median expansion angle, according to the dotted line (19), is marked with $\alpha$ and can be chosen between approximately 0.4° and 8°, preferably about 4° to 7°. By preference, the expansion angle of the individual stages (13, 14 and 15) is constant, but it can also vary depending on the requirements. In the same way, the number of stages (13. 14 and 15) per length can be chosen to in accordance with the requirements; and a single stage represents the most simple case. Furthermore, the length of the subsonic diffuser (11) can be adapted to the necessities or product requirements, and a longer fiber can be produced with a longer subsonic diffuser (11) provided that the expansion angle of the diffuser is dimensioned adequately.

Figure 2:
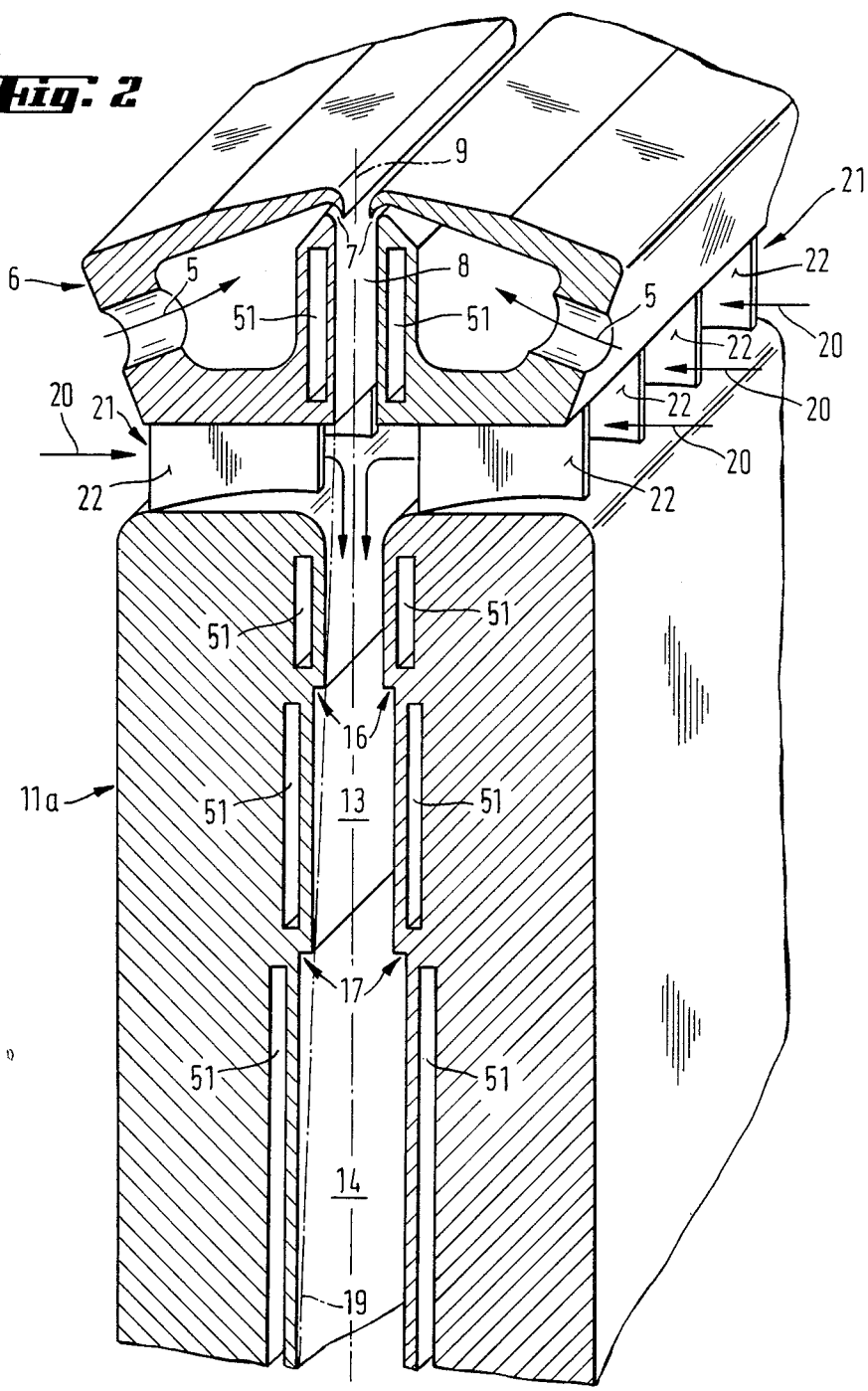
FIG. 2 essentially corresponds to the representation in FIG. 1, but shows a different design with a two-stage subsonic diffuser and supply of ambient medium between the blast pipe and the subsonic diffuser.

FIG. 2, in which corresponding parts are marked with the same reference numbers as in the other designs, illustrates a two-stage subsonic diffuser (11a), whose entrance zone, which is not designed as a stage with a sudden cross-sectional widening, is not directly connected to the emergence cross-section of the drawing gap (8), but is located at a distance to it. In this way, as is sometimes desired for certain unraveling conditions and specific products, additional ambient medium (20) is sucked in between the blast pipe (6) and the subsonic diffuser (11a) and is fed to the main flow in the subsonic diffuser (11a). This supply of ambient medium (20) is achieved by means of a conducting body (21) with parallel guide walls (22) having the form of guide plates, which, preferably, are mounted vertically to the side walls of the blast pipe and parallel to the main flow direction. In this way,. practically two-dimensional flow conditions are maintained at the entrance of the subsonic diffuser (11a) despite the introduction of the additional ambient medium (20) in a long-drawn-out design of the blast pipe (6) and the subsonic diffuser (11a). In principle, the additional ambient medium can also enter after one or several sudden cross-sectional widenings.

FIG. 3 shows detail A from FIG. 1. In the present example, it shows the crossover from stage 13 to stage 14. As can be seen clearly from the detail, the setoff surface (31) of the setoff (17) between stage 13 and stage 14 is formed by a horizontal wall that is vertically connected to the vertical flow border of stage 13. This horizontal wall gradually becomes the vertical flow border within the area of stage 14. If, as is schematically illustrated in FIG. 1, this crossover is also designed in a rectangular shape, then a dead zone is generated, in which the whirl (marked with 32 in FIG. 3) can deposit very fine fiber parts taken from the main flow (33) in the reflux zone of stage 14. For this reason, the crossover is designed as a curve in the version according to FIG. 3.

Correspondingly, the crossover between setoff level (31) and the vertical flow border of stage 14 is designed as a slant level (35) in the version illustrated in FIG. 4.

In the design illustrated in FIG. 5, the crossover is designed as a recess (36), which, in comparison to the cross-sectional widening between stages 13 and 14, exhibits an even further expanded cross-section. If such a recess is included in the dimensioning according to FIG. 5, then the whirls (32) come to a rest in it. In the case of reduced axial expansion of the recess (36) at the setoff (17) between stages 13 and 14, which, in the present example, have been included for clarity, then a long-drawn-out whirl (32) can form. Behind this whirl a secondary whirl is generated in the recess (36), which moves in the opposite direction. In any case, the designs shown in FIGS. 3 to 5 ensure that depositions of very fine fibers are somehow reduced markedly and that a self-cleaning effect is achieved by avoiding dead zones in corners.

By using a subsonic diffuser (11) according to FIG. 1, fibers having fiber lengths of about one thousand to ten thousand times the fiber diameter and more that are considerably finer and exhibit less bead content than in the past can be produced with blast drawing. A further improvement can be attained if more steps supporting the fiber guidance are introduced, in particular, in the first stage (13). As a result of high transverse acceleration of the still molten fibers caused by slight cross-sectional widenings, undesirable wall contact can occur there, which, in addition to bead formation, leads to increased wear of the material of the fixed flow border of the subsonic diffuser (11).

Figure 6:
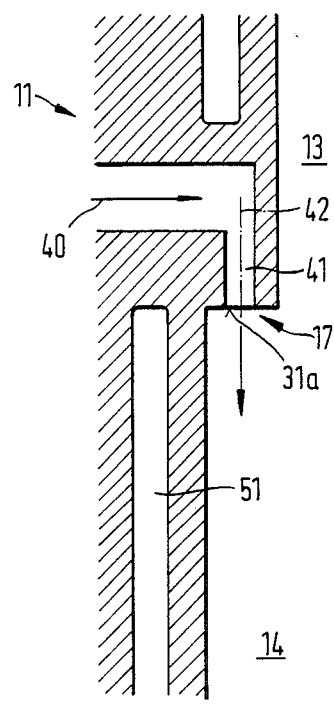
FIG. 6 essentially corresponds to the representations in FIGS. 3 to 5, but shows the area of the reflux in a stage of the subsonic diffuser with supply of blasting medium.
Figure 7:
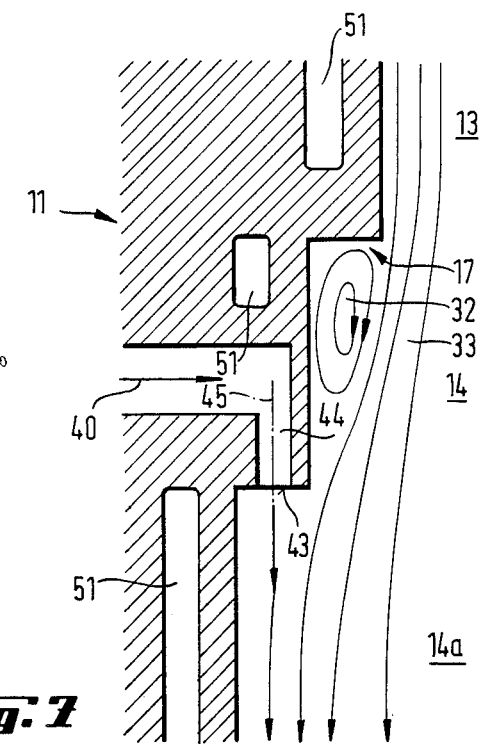
FIG. 7 essentially corresponds to the representation in FIG. 6, but in a modified design.

This can be countered by generating additional propellant, preferably compressed air, below at least the first setoff level (31), as is illustrated in FIGS. 6 and 7. According to FIG. 6, additional blasting medium (40) is blast in through nozzles (41) on a setoff level (31a) and the axes (42) of the nozzles (41) are essentially arranged parallel to the longitudinal middle axis (9) of the subsonic diffuser (11). According to FIG. 7, the blasting medium (40) is blast-in below the setoff level (31) at another setoff level (43) via nozzles (44) with axes (45), which are also essentially arranged paralled to the longitudinal middle axis (9) of the subsonic diffuser (11). Whereas the additional blast medium (40) replaces the cushioning function of the whirl (32) in the case of the design shown in FIG. 6, it is used in addition to this function by forming another stage (14a) in the subsonic diffuser (11) in the design illustrated in FIG. 7.

Figure 8:
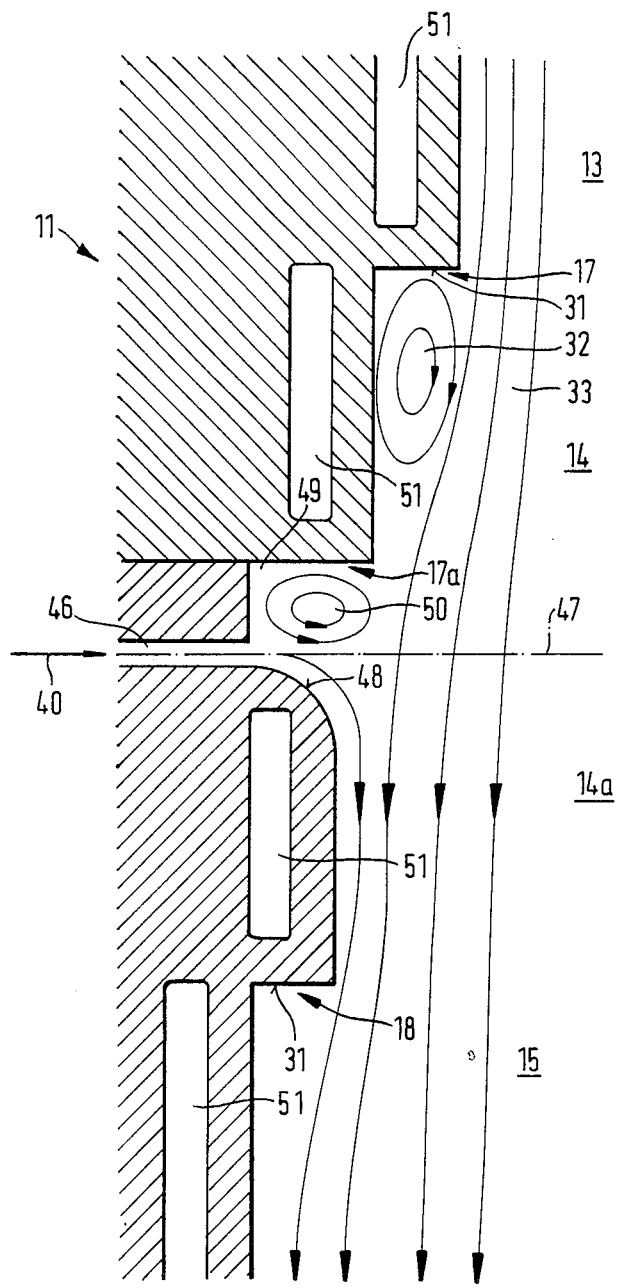
FIG. 8 essentially corresponds to the design illustrated in FIGS. 6 and 7, but shows another modified version.

In the design according to FIG. 8, the blast medium (40) exhibits a high transverse component with regard to the main flow direction and is to be preferably arranged in the vicinity of the back-up point of the reflux zone, which is formed downstream from the setoff (31). By preference, transverse streams of the blasting medium (40) are blast in through nozzles (46) with an axis (47) that lies transverse to the middle longitudinal axis (9) of the subsonic diffuser (11) immediately above the contact point of the main flow in order to attain a stronger wall-repelling effect or to completely prevent wall contact.

In the design according to FIG. 8, the transverse streams of the blasting medium (40) are introduced in such a way that the lower border level (48) has a curve radius that is adequate for the transverse streams, so that the transverse flow follows the curve there (primary Coanda effect) and is turned back into the main flow direction without seriously obstructing or "constricting" the main flow. The nozzles (41, 44 and 46) can be designed as slotted nozzles or they can consist of a row of openings, preferably holes. The emergence plane of the transverse blast streams through nozzles (46) can, compared to the longitudinal middle axis (9) of the subsonic diffuser (11), be inclined by an angle of about 10° to 120°, preferably by about 60° to 90°.

During the supply of blasting medium (40) through transversely located nozzles (46) it is essential that their lower border surface (48) is situated as closely as possible to the emergence plane of the transverse streams, i.e. that it guides these transverse streams, while the opening of the nozzle (46) can be located at a distance from the setoff (17a) in a recess (49) and is also set back to such an extent, in comparison to the vertical flow borders of the corresponding diffuser stage, that another swirl (50), which turns in the opposite direction, is generated above the level of the nozzles (46). This additional swirl (50) is stationary due to the geometric arrangement.

Since the blast-in conditions of the blasting medium (40) through nozzles (46) can be adjusted according to the requirements, experts have, together with the measures already explained above, ample means of influencing the desired fiber quality as regards fineness, bead content and length.

The facility according to FIG. 1, possibly in a modified form as is explained in more detail in connection with FIGS. 3 to 8, ensures a smooth and strong widening, and, thus, deceleration of the main flow in the subsonic diffuser (11).

At the same time, the border stresses of the speed profile from the drawing gap (8) are distorted by the energy consumption of these specific whirls (32) as well as any other whirls (50) and, thus, the speed profile is increasingly smoothed out, and a systematic energy yield can result through strong delays in the flow along the border that are caused by blasting medium (40). As a result of the strong widening of the flow and the ensuing strong increase in pressure, the fiber-gas-dispersion emerges at the emergence plane (12) of the subsonic diffuser (11) with comparably slight low-pressure as compared to the environment, so that the suction of secondary air is minimized here. This also reduces the costs for sucking off the overall amounts of gas through and beyond the discharge belt.

In the case of a slight longitudinal extension of the molten-mass separating device (1) or the blast pipe (6) and the subsonic diffuser (11), and, thus, slight length of the row of primary fibers or emergence holes (2), blast pipe (6) and subsonic diffuser (11 or 11a) can also exhibit an elliptic or round cross-section instead of a long-drawn-out rectangular cross-section.

If the vertical total length of a subsonic diffuser (11 or 11a) downstream of the blast pipe (6) is adequately dimensioned, then the actual unraveling process is essentially completed when the fibers pass through the emergence plane (12). However, it may be necessary to take additional measures in a further step with regard to the deposition width of the produced fibrous web. This can be achieved by connecting the emergence cross-section (12) of the subsonic diffuser (11 or 11a) with the entrance cross-section of a guide shaft, which exhibits a larger expansion angle transverse to the transport direction of the discharge belt. In the process, secondary air can be permitted to enter between the subsonic diffuser (11 or 11a) and the guide shaft; however, in order to achieve two-dimension conditions a guide facility corresponding to guide facility 21 is to be used. In order to form a wide fibrous web the guide shaft can be tapered in such a way in the transport direction of the discharge belt that the cross-section of the guide shaft does not change in the main flow direction and only increases or decreases slightly. If a guide device corresponding to guide device 21 is applied between the subsonic diffuser (11 or 11a) and the guide shaft, then means for regulating the cross-section can be mounted on it. These regulatory means can be used to correct undesired deviations in the smoothness of the fibrous web. In this connection, the guide shaft can be arranged so closely to the discharge belt that no fall shaft having several unraveling facilities is required anymore.

As shown in the drawing, the walls of the drawing gap (8) of the blast pipe (6) and the subsonic diffuser (11 or 11a) exhibit cooling ducts, which are altogether marked with 51. The flanks of the drawing gap (8) or the fixed flow border of the subsonic diffuser (11 Or a) can be subjected to a strong cooling action by means of these cooling ducts. On the one hand operational safety is ensured by cooling the surfaces, which directly exchange heat with the fiber dispersion, because accidentally appearing molten parts tend to stick to the hot surfaces and would cause the blast pipe (6) to overflood. Through this, however, the blast-pipe flanks, which up to now preferably were made of nickel can be made of a less expensive material, e.g. special steel, which is also more wear resistant. On the other hand, the coolant carries off so much heat that the climate in a downstream fall shaft is relieved, i.e. the danger of premature hardening of bonding agents that are still in the fall shaft is reduced. Possibly the heat carried off with coolant can be used elsewhere.

Another advantage of using cooling ducts (51) is that the blast-pipe halves can be arranged closer to each other, thereby decreasing the share of the ambient media that is sucked in. As a result, correspondingly less amounts of gas need to be sucked off through the product and subsequently treated. In addition, the temperature level in the unraveling zones is increased with shorter distances between the flanks, favouring the formation of more fine fibers with less bead content.

Figure 9:
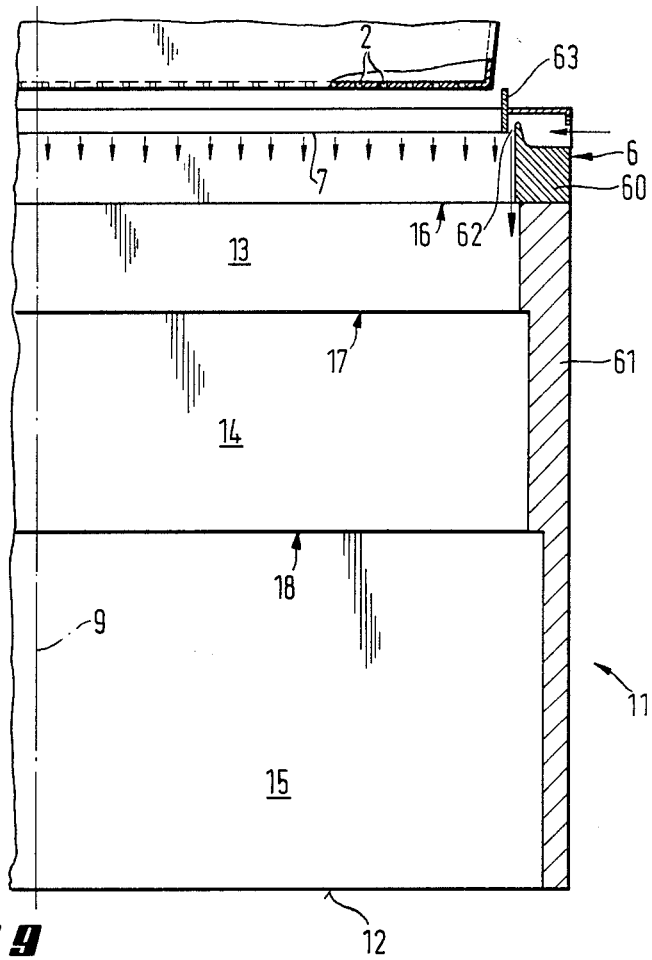
FIG. 9 shows a schematically simplified longitudinal section of a diffuser according to FIG. 1.
Figure 10:
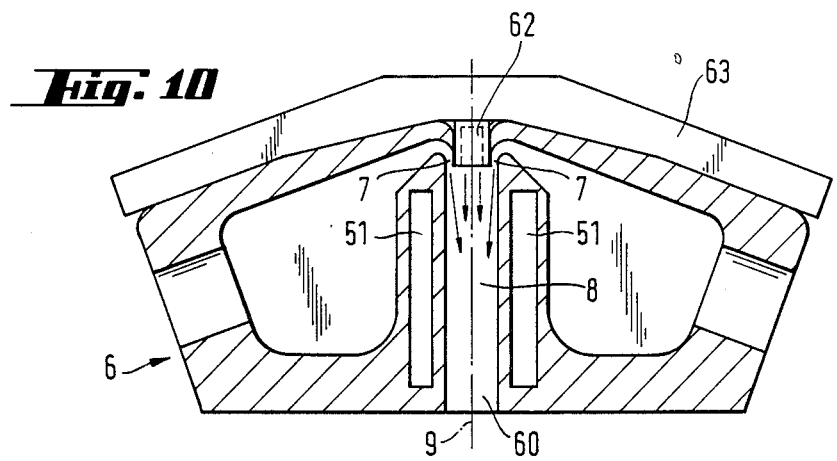
FIG. 10 corresponds to the representation in FIG. 1 and shows a section of the blast pipe of the facility according to FIG. 1 with a view of its front end.

FIG. 9 offers half of a longitudinal section through the facility according to FIG. 1 and clearly shows that the blast pipe (6) and subsonic diffuser (11) are closed at the face sides by means of face walls (60 and 61). In this way, so-called end effects are avoided, which lead to deviations from the actually two-dimensional flow conditions in the area of the face sides. Furthermore, this also helps prevent any large amounts of secondary air from being sucked in at the face sides, which would have to be disposed of by the discharge belt after passing through the facility.

In the present example, additional devices are provided on the face to guide the flow. These consist of facilities arranged between the blast-pipe halves with the purpose of generating an adequately high vacuum at the flow borders on the face, here they are designed as nozzles (62). By means of these nozzles additional propellant streams of a blasting medium, preferably compressed air, are introduced at high speeds parallel to the main flow direction. In the same way, additional wall stream nozzles can be mounted on the inner face sides of the subsonic diffuser, e.g. according to FIGS. 6, 7 or 8. The nozzles (62) can be designed as slotted nozzles, but can also exhibit at least one emergence opening in the form of a hole respectively. The low-pressure at the face helps to prevent detachment of the flow or the build-up of an increased static pressure at the face sides of the subsonic diffuser (11), which would form due to the lack of a capsule at the face side as well as due to the three-dimensional suction conditions along the face sides of the blast pipe, leading to uneven fiber deposition. The effect of the supply of additional blasting media at the face sides can be further increased when the upper covering of the additional blast pipe (62) on the face side exhibits an essentially vertical flow border (63), which, for example, can be made of sheet metal, and towers over the upper surface of the blast pipe 6 in adequate height and length, ensuring predominantly two-dimensional suction of the hot combustion gases and sucked-in ambient media involved in the unraveling process. Thus, an essentially more smooth heating of the molten-mass separating device (1) and, subsequently, a homogeneous product composition is achieved.

As can be seen from FIG. 9, the emergence plane of the additional nozzles (62) on the face sides is arranged level with the nozzles (7). However, in individual cases, the preferred height of the emergence opening of the additional nozzles (62) can also be higher or lower.

The flow borders along the face (63) of the additional nozzles (62) preferably are arranged parallel to the main flow direction, however, they can also be inclined at angles up to about 8° in both directions counter to it. The nozzles on the face side (62) can be rotatable within these limits.

The face walls (61) in the area of the subsonic diffuser (11) can form a continuous flow border, but preferably they are graduated in the same way as the side walls of the subsonic diffuser (11). In this connection, the face walls can be designed at right angles to the side walls as well as semicircular.

Naturally, the face walls (60 and 61) can be provided with cooling ducts (51), if required.

The subsonic diffuser (11 or 11a) according to FIG. 1 or 2, can, in principle, have any length. In a corresponding longer design, the flow can be led up to the direct vicinity of the discharge belt during unraveling with several units, thereby advantages as regards the distribution of overall density of the fibrous web can be obtained as compared to conventional fall shaft systems.

We claim:

1. Apparatus for generating mineral fibers from a molten mass according to a blast drawing process, said apparatus comprising:
   a blast pipe having a drawing gap through which at least one primary fiber from the molten mass can be fed and unraveled towards an emergence opening under influence of blast streams that are laterally blasted-in in the direction of the primary fiber; and
   a subsonic diffuser having flow borders coupled to the emergence opening of the blast pipe, which diffuser is used to delay gas-fiber dispersion and solidify the molten fiber into compact fibers;
   wherein the subsonic diffuser is designed as a thrust diffused with at least one sudden cross-sectional widening of the flow borders.

2. Apparatus according to claim 1, wherein one single sudden cross-sectional widening between the blast pipe and the subsonic diffuser is provided.

3. Apparatus according to claim 1 or 2, wherein the subsonic diffuser includes several stages arranged one after another with sudden cross-sectional widening.

4. Apparatus according to claim 3, wherein the length of each stage amounts to at least five times the difference of the roots of its emergence and its entrance cross-section.

5. Apparatus according to one of the claims 1 or 2, wherein the subsonic diffuser has walls which expand from entrance to emergence at a median expansion angle within the range of 0.4° to 8°.

6. Apparatus according to one of the claims 1 or 2, wherein a rounded recess with an even further enlarged cross-section in comparison to the expanded cross-section is provided at the beginning of the sudden cross-sectional widening.

7. Apparatus according to one of the claims 1 or 2 wherein nozzles are provided below the sudden cross-sectional widening to supply further blasting medium.

8. Apparatus according to claim 7, wherein the subsonic diffuser has a middle axis and the nozzles have middle axes oriented at least almost parallel to the middle axis of the subsonic diffuser.

9. Apparatus according to claim 7, wherein the subsonic diffuser has a middle axis and the nozzles have middle axes located transverse to the middle axis of the subsonic diffuser and wherein the nozzles are arranged in the downstream area of a recess.

10. Apparatus according to claim 9, wherein the subsonic diffuser has a longitudinal middle axis and the blast medium is diverted over a bent border surface parallel to the longitudinal middle axis of the subsonic diffuser.

11. Apparatus according to one of the claims 1 or 2 wherein the blast pipe and subsonic diffuser unravel at least one row of primary fibers and the subsonic diffuser is isolated from the environment by end face walls.

12. Apparatus according to claim 11, wherein an interior side of the face walls of the subsonic diffuser correspondingly recede at the points of the sudden cross-sectional widening.

13. Apparatus according to claim 1 or 2 wherein the blast pipe has end face walls and nozzles are provided at the face walls of the blast pipe to introduce blast medium in a direction parallel to the walls.

14. Apparatus according to one of the claims 1 or 2 wherein the blast pipe has end face side walls and the side walls of the blast pipe include cooling ducts for the passage of a coolant.

15. Apparatus as in claim 1 or 2 wherein a slanted recess with an even larger cross-section in comparison to the expanded cross-section is provided at the beginning of the sudden cross-sectional widening.

16. Apparatus as in claim 1 or 2 wherein nozzles are provided at the points of the sudden cross-sectional widening to supply further blasting medium.

* * * * *